United States Patent [19]

Steacy

[11] Patent Number: 4,548,619
[45] Date of Patent: Oct. 22, 1985

[54] DEHYDROCYCLODIMERIZATION PROCESS

[75] Inventor: Paul C. Steacy, Des Plaines, Ill.

[73] Assignee: UOP Inc., Des Plaines, Ill.

[21] Appl. No.: 659,925

[22] Filed: Oct. 11, 1984

[51] Int. Cl.$^4$ .......................................... B01D 53/22
[52] U.S. Cl. ............................................. 55/16; 55/27; 55/48; 55/68; 62/23; 208/103; 585/818
[58] Field of Search .............. 55/16, 27, 48, 68; 62/23, 24; 208/101, 103–105; 585/818, 819

[56] References Cited

U.S. PATENT DOCUMENTS

| | | | |
|---|---|---|---|
| 2,992,283 | 7/1961 | Eng | 260/673 |
| 3,101,261 | 8/1963 | Skarstrom | 55/58 |
| 3,450,500 | 6/1969 | Setzer et al. | 585/818 X |
| 3,537,978 | 11/1970 | Borst, Jr. | 208/101 |
| 3,574,089 | 4/1971 | Forbes | 208/101 |
| 3,761,389 | 9/1973 | Rollmann | 208/64 |
| 3,838,553 | 10/1974 | Doherty | 55/58 |
| 3,843,740 | 10/1974 | Mitchell et al. | 260/673 |
| 4,070,165 | 1/1978 | Colton | 62/23 X |
| 4,180,388 | 12/1979 | Graham et al. | 55/16 |
| 4,180,689 | 12/1979 | Davies et al. | 585/407 |
| 4,229,188 | 10/1980 | Intille | 55/16 |
| 4,238,204 | 12/1980 | Perry | 55/16 |
| 4,264,338 | 4/1981 | Null | 55/16 |
| 4,329,532 | 5/1982 | Conn et al. | 585/407 |
| 4,347,394 | 8/1982 | Detz et al. | 585/419 |
| 4,367,135 | 1/1983 | Posey, Jr. | 55/16 X |
| 4,381,417 | 4/1983 | Vora et al. | 585/655 |
| 4,381,418 | 4/1983 | Gewartowski et al. | 585/655 |
| 4,398,926 | 8/1983 | Doshi | 55/16 |
| 4,444,988 | 4/1984 | Capsuto et al. | 585/415 |
| 4,466,946 | 8/1984 | Goddin, Jr. et al. | 55/16 X |

*Primary Examiner*—Robert Spitzer
*Attorney, Agent, or Firm*—Thomas K. McBride; William H. Page, II; John F. Spears, Jr.

[57] ABSTRACT

A process is disclosed for the recovery of hydrogen and C$_6$-plus product hydrocarbons from the effluent stream of a hydrogen-producing hydrocarbon conversion process. The effluent stream of the reaction zone is partially condensed to remove the bulk of the heavy C$_6$-plus hydrocarbons, which are then sent to a fractionation zone. The remaining vapor is compressed to a substantially higher pressure. The compressed vapor is then passed into a membrane separation zone in which a hydrogen-rich stream is separated from the compressed vapor. The relatively high pressure nonpermeate portion of the vapor stream which emerges from the membrane separation zone is partially condensed by autorefrigeration. The still high pressure mixed phase fluid is separated into vapor and liquid portions. The liquid phase material is then flashed to produce coolant used to perform the partial condensation.

12 Claims, 1 Drawing Figure

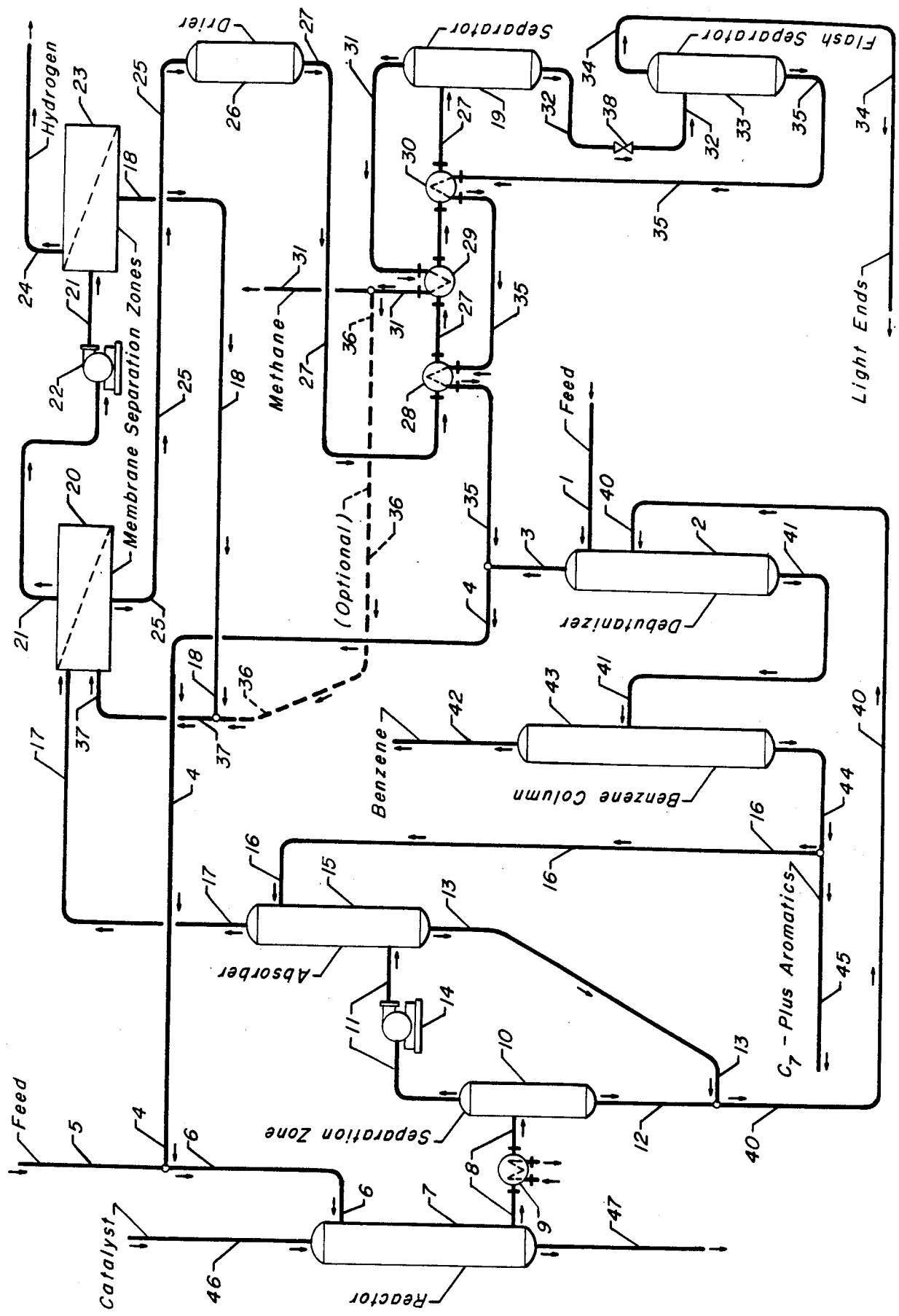

DEHYDROCYCLODIMERIZATION PROCESS

FIELD OF THE INVENTION

The subject process relates to a hydrocarbon conversion process. Specifically, the subject process relates to a catalytic process referred to as dehydrocyclodimerization wherein two or more molecules of a light aliphatic hydrocarbon, such as propane, are joined together to form a product aromatic hydrocarbon. Nonaromatic hydrocarbons are also produced, especially when substantial amounts of olefins are present in the feed. The invention specifically relates to a separatory method which may be used to recover hydrogen and product aromatic hydrocarbons from a vapor phase reaction zone effluent stream. This separatory method allows for recycling unconverted feed hydrocarbons to the reaction zone.

INFORMATION DISCLOSURE

There are a large number of references which describe the conversion of light aliphatic hydrocarbons to aromatic hydrocarbons. For instance, U.S. Pat. No. 2,992,283 issued to J. Eng describes the conversion of propylene to a variety of higher molecular weight hydrocarbons using a treated crystalline aluminosilicate as the catalyst. U.S. Pat. No. 4,347,394 issued to C. M. Detz et al. describes the conversion of $C_5$-plus hydrocarbons to aromatics using a nonacidic zeolide supporting a platinum compound. U.S. Pat. No. 4,329,532 issued to P. J. Conn et al. describes the conversion of $C_4$-minus olefins or mixtures of olefins and paraffins to aromatic hydrocarbons. The catalyst comprises a crystalline silicate having a specified composition, crystallite size range, and X-ray diffraction pattern. U.S. Pat. No. 4,444,988 issued to L. M. Capsuto et al describes a process flow for the recovery of the products of a similar process consuming a $C_2$-$C_5$ olefinic feedstock.

U.S. Pat. No. 4,180,689 issued to E. E. Davies et al describes the conversion of $C_3$-$C_8$ aliphatic hydrocarbons to aromatic hydrocarbons in a process which employs a catalyst comprising gallium supported on an aluminosilicate. U.S. Pat. No. 3,761,389 issued to L. D. Rollmann et al describes an improved process for converting $C_2$ to 400° F. hydrocarbons to aromatics over a ZSM-5 type catalyst. The improvement resides in the use of two reaction stages in series, with the first being at more severe operating conditions. U.S. Pat. No. 3,843,740 issued to T. 0. Mitchell et al also describes a process for aromatizing aliphatic feedstocks using two different catalysts in the reactor. This reference is also pertinent for the process diagram illustrating the recovery of the product aromatics by fractionation.

The separation of product hydrocarbons from a reaction zone effluent stream which also contains light hydrocarbons and possibly hydrogen is important to the successful operation of several hydrocarbon conversion processes. For instance, U.S. Pat. No. 3,537,978 issued to W. B. Borst, Jr. and 3,574,089 issued to J. T. Forbes describe the recovery of naphtha, hydrogen-rich recycle gas, and light hydrocarbon streams from the effluent of a catalytic reforming zone. U.S. Pat. No. 3,101,261 issued to C. W. Skarstrom illustrates a process to recover hydrogen light ends and naphtha from the effluent of a reforming reaction zone. These references are pertinent for their showing of the use of such separatory techniques as partial condensation, stripping columns, and absorption.

U.S. Pat. Nos. 4,381,417 issued to B. V. Vora et al. and 4,381,418 issued to S. A. Gewartowski et al. describe product recovery systems for dehydrogenation processes in which expansion of a gas stream provides fluids used as coolant media. Referring to the latter reference, the reactor effluent is cooled, dried, further cooled, and then passed into a vapor-liquid separation zone 28. The vapors from this zone are depressurized in turbine 32 to yield a cold mixed phase stream collected in separation zone 34. Liquid from this zone is flashed into the separation zone 51.

U.S. Pat No. 3,838,553 issued to K. S. Koherty is pertinent for its description of the use of low temperatures and elevated pressures to affect the separation of vapors and for the integration of a low temperature separation zone with a different type of separation zone. In FIG. 2 of this reference, the still high pressure effluent of the low temperature separation zone flows into a pressure swing adsorption zone.

Selectively permeable membranes are described in U.S. Pat. Nos. 4,180,388 issued to T. E. Graham et al. and 4,264,338 issued to H. R. Null. These references are also pertinent for their showing of various arrangements of two or more membrane separation units in various series flow with recycle and interstage compression.

BRIEF SUMMARY OF THE INVENTION

The invention is a unique method of separating the product hydrogen and $C_6$-plus hydrocarbons from the vapor phase effluent stream of a dehydrocyclodimerization process. The process is characterized by a flow scheme which features an initial compression of a vapor stream followed by integrated absorption, selective membrane separation and autorefrigeration zones. This allows obtaining the benefits of these different separation techniques without extensive utilities and capital costs for gas compression. A broad embodiment of the invention may be characterized as a process for the recovery of hydrogen from a vapor phase stream derived from a reactor effluent of a hydrocarbon conversion process which comprises the steps of compressing a vapor phase first process stream which comprises hydrogen and $C_1$-$C_3$ hydrocarbons; passing the first process stream into a membrane separation zone in which the first process stream is contacted with at least one selective membrane through which hydrogen selectively permeates and thereby producing a hydrogen-rich product stream which is removed from the process and a vapor phase second process stream which comprises $C_1$-$C_3$ hydrocarbons; forming a vapor phase third process stream comprising methane and a liquid phase fourth process stream which comprises ethane and propane by partially condensing the second process stream by indirect heat exchange against a cooling medium followed by vapor-liquid separation; flashing the fourth process stream to a substantially lower pressure and thereby forming a vapor phase sixth process stream, which comprises methane and a liquid phase fifth process stream, which comprises propane; employing the fifth process stream to cool the second process stream; and removing the fifth and sixth process streams from the process.

BRIEF DESCRIPTION OF THE DRAWING

The drawing is a simplified schematic diagram of a process which converts a propane-containing mixture fed through lines 1 and 5 into benzene removed in line 42 and C$_7$-plus aromatics removed in line 45. The effluent stream of the reactor 7 is partially condensed and separated into vapor and condensate phases. The vapor phase is processed through the absorber 15 to yield vapor which flows into selective membrane separation zones 20 and 23. The nonpermeate gases enter an autorefrigeration loop. The condensate phase portion is transported into a fractionation zone comprising columns 2 and 43.

DETAILED DESCRIPTION

Processes for the conversion of light aliphatic hydrocarbons to aromatic or nonaromatic C$_6$-plus hydrocarbons have been the subject of significant development efforts a evidenced by the previously cited references. The basic utility of the process is the conversion of the low cost highly available C$_3$ and C$_4$ hydrocarbons into the more valuable aromatic hydrocarbons and hydrogen or to convert the feed hydrocarbons to higher molecular weight products. This may be desired simply to upgrade the value of the hydrocarbons. It may also be desired to correct an overabundance of the C$_3$ and C$_4$ hydrocarbons or to fulfill a need for the aromatic hydrocarbons. The aromatic hydrocarbons are highly useful in the production of a wide range of petrochemicals, with benzene being one of the most widely used basic feed hydrocarbon chemicals. The product aromatic hydrocarbons are also useful as blending components in high octane number motor fuels.

The feed compounds to the subject process are light aliphatic hydrocarbons having from 2 to 4 carbon atoms per molecule. The feed stream may comprise a single compound or a mixture of two or more of the compounds. The preferred feed compounds are propane, propylene, the butanes, and the butylenes. The preference for an olefinic or a saturate feed is dependent on the price of the available feeds and the value of the corresponding products. The feed stream to the process may also contain some C$_2$ and C$_5$ hydrocarbons. It is preferred that the concentration of C$_5$ hydrocarbons in the feed stream to the process is held to the minimum practical level. The normally preferred products of the process are C$_6$-plus aromatic hydrocarbons. However, with an olefinic feed substantial amounts of aliphatic C$_6$-plus compounds are produced. Dehydrocyclodimerization processes are not 100% selective and some nonaromatic C$_6$-plus hydrocarbons are produced even from saturate feeds. The very great majority of the C$_6$-plus product hydrocarbons will nevertheless be benzene, toluene, and the various xylene isomers with a high purity saturate feed. A small amount of C$_9$-plus aromatics is also produced. Sizable olefin concentrations in the feed significantly decrease the production of aromatics.

The subject invention is directed to the recovery of the product hydrocarbons from the effluent stream of the reaction zone. Therefore, the configuration of the reaction zone and the composition of the catalyst employed within the reaction zone are not basic elements of the invention or limiting characteristics of the invention. Nevertheless, in order to provide a background to the subject invention, it is felt useful to describe the preferred reactor system. This system comprises a moving bed radial flow multistage reactor such as is described in U.S. Pat. Nos. 3,652,231; 3,692,496; 3,706,536; 3,785,963; 3,825,116; 3,839,196; 3,839,197; 3,854,887; 3,856,662; 3,918,930; 3,981,824; 4,094,814; 4,110,081; and 4,403,909. These patents also describe catalyst regeneration systems and various aspects of moving catalyst bed operations and equipment. This reactor system has been widely employed commercially for the reforming of naphtha fractions. Its use has also been described for the dehydrogenation of light paraffins.

This reactor system normally employs a spherical catalyst having a diameter between about 1/64 and $\frac{1}{8}$ inch. The catalyst preferably comprises a support material and a metallic component deposited on the support material as through impregnation or coprecipitation. The previously cited references point out that the current trend is the use of a zeolitic support material, with the catalyst referred to in the art as a ZSM-5 type zeolite being often specified as a preferred material. When properly formulated, it appears this zeolitic material by itself has significant activity for the dehydrocyclodimerization reaction. However, it is still preferred to employ a metallic component within the catalyst system to increase the activity of the catalyst. The preferred metallic component is gallium as described in the previously cited U.S. Pat. No. 4,180,689. A dehydrocyclodimerization reaction zone is preferably operated at a temperature between about 920°–1050° F. (487°–565° C.) and a pressure under 100 psig. Hydrogen-producing reactions are normally favored by lower pressures, and pressures under about 70 psig at the outlet of the reaction zone are highly preferred. Other conditions may be preferred for other reactions.

The drawing illustrates the preferred embodiment of the invention. Those skilled in the art will recognize that this process flow diagram has been simplified by the elimination of many necessary pieces of process equipment including some heat exchangers, process control systems, pumps, fractionation column overhead and reboiler systems, etc. It may also be readily discerned that the process flow presented in the drawing may be modified in many aspects without departing from the basic overall concept of the invention. For example, the heat exchange shown in the drawing has been held to a minimum for purposes of simplicity. Those skilled in the art will recognize that the choice of heat exchange methods employed to obtain the necessary heating and cooling at various points within the process is subject to a large amount of variation as to how it is performed. In a process as complex as this, there exists many possibilities for indirect heat exchange between different process streams. Depending on the specific location and circumstance of the installation of the subject process, it may also be desired to employ heat exchange against steam, hot oil, or process streams from other processing units not shown on the drawing.

Referring now to the drawing, a first liquid phase feed stream comprising an admixture of propane and butane is passed into a debutanizer column 2 through line 1. The C$_4$-minus hydrocarbons which enter the debutanizer 2 are concentrated into a net overhead stream carried by line 3, which is combined with a recycle stream from line 35 to form the stream flowing through line 4. This stream is admixed with a second feed stream of equal composition carried by line 5 to form a charge stream which is passed into the reactor 7 via line 6. The hydrocarbons which enter the reactor 7 are therein contacted with a dehydrocyclodimerization catalyst at conditions effective to convert a significant amount of the entering paraffins to aromatic hydrocarbons, a process which also produces significant quantities of hydrogen and some lighter hydrocarbons such as methane and ethane. Preferably, the reactor 7 contains several separate stages in which the feed materials are contacted with moving beds of catalyst. Interstage heaters not shown in the drawing would be provided to supply the necessary heat for the endothermic dehydrocyclodimerization reaction. If a highly olefinic charge stream was being processed, this would result in an exothermic reaction and interstage coolers would be provided instead. Fresh or regenerated catalyst is passed into the top of the reactor through line 46 and the used or spent catalyst is withdrawn through line 47 for passage to regeneration facilities.

The effluent of the reactor 7 is a vapor phase stream comprising an admixture of reaction products and feed hydrocarbons. This vapor phase stream is first cooled through the use of heat exchangers represented by the indirect heat exchange means 9 and is then passed via line 8 into a first vapor-liquid separation zone 10. The reaction zone effluent stream is cooled sufficiently prior to passage into zone 10 such that a very large percentage of the readily condensable $C_6$-plus hydrocarbons enter the separation zone in a liquid phase state. A liquid hydrocarbon phase comprising these $C_6$-plus hydrocarbons and dissolved lighter hydrocarbons and hydrogen is removed from the separation zone in line 12 and admixed with a stream of rich absorption zone liquid carried by line 13. This admixture of liquid phase hydrocarbons is then passed into the debutanizer column 2 through line 40. The debutanizer column separates the entering hydrocarbons into the $C_4$-minus stream removed overhead and a $C_5$-plus stream removed as a net bottoms stream through line 41. The benzene column 43 separates these $C_5$-plus hydrocarbons. A net overhead stream which is rich in benzene is removed through line 42. A net bottoms stream comprising $C_7$-plus compounds is removed through line 44. The $C_7$-plus stream is divided into the product stream removed through line 45 and a stream passed into an absorber 15 through line 16 as a lean absorption liquid. Alternatively, $C_5$ hydrocarbons may be removed overhead via line 3 and recycled to the reactor. This may be desired to increase the purity of the benzene stream removed overhead in line 42.

The uncondensed portion of the reactor effluent stream is removed from the separation zone 10 through line 11. This stream contains hydrogen and an equilibrium concentration of all hydrocarbons present in the reactor effluent. This vapor phase material is then compressed to a substantially higher pressure in the compressing means 14. Multiple stage compression with interstage cooling is normally employed to achieve the required compression. The compressed vapor stream is then passed into a lower part of the absorber 15. The vapors pass upward countercurrent to descending absorption liquid, which results in the removal of some light hydrocarbons and substantially all benzene from the rising vapor but may release toluene to the vapor. There is thereby produced a high pressure stream carried by line 17 which comprises an admixture of hydrogen and $C_1$-$C_7$ hydrocarbons except benzene. The total removal of aromatics may be desired as described below.

The relatively high pressure gas stream carried by line 17 is passed into a membrane separation zone 20 together with a gas stream carried by line 37. The gas which passes through the selective permeation membrane of zone 20 is withdrawn in line 21. This gas is compressed in means 22 and injected into a second membrane separation zone 23. The gas which passes through the membrane of the second zone 23 is removed from the process through line 24 as a hydrogen-rich off-gas stream. As used herein, the term "rich" is intended to indicate a concentration of the specified compound or class of compounds in excess of 50 mole percent. The gases which do not permeate the membrane of separation zone 23 are removed in line 18 and recycled to the first separation zone via line 37. The gas which does not permeate the membrane of zone 20 is removed in line 25 and passed through an optional dryer 26 to ensure the removal of water which may freeze out in the subsequent low temperature operations.

The resultant dry high pressure gas is carried by line 27 and passes through indirect heat exchange means 28, 29 and 30 in which it is cooled to successively lower temperatures. This cooling causes a partial condensation of the material flowing through line 27 prior to its passage into a second vapor-liquid separator 19. A vapor stream comprising hydrogen, methane, and ethane is removed through line 31 from the separator and is employed as coolant in the indirect heat exchange means 29 prior to being removed from the process. Optionally, a portion of this material may be recycled to the membrane separation zones via line 36 although this is not preferred. The liquid phase material collected in the separator comprises methane, propane, butane, and any higher molecular weight hydrocarbons which are present in the stream of line 27. This liquid is removed in line 32 and passed through a flash valve 38 into the flash separator 33. The reduction in pressure produces a vapor phase stream comprising methane and ethane removed in line 34 as a light ends off-gas stream and a liquid phase stream comprising propane and butane removed in line 35. This relatively low temperature liquid is used a coolant in indirect heat exchange means 30 and 28 and is then recycled to the reaction zone through lines 4 and 6.

The invention may be applied to the separation of hydrogen and $C_6$-plus hydrocarbons from the effluent streams of processes other than those which produce mainly aromatic products. Such processes are described in the previously cited references. However, the preferred embodiment of the invention is a process for the separation of the effluent stream of a dehydrocyclodimerization reaction zone which comprises the steps of partially condensing a vapor phase dehydrocyclodimerization reaction zone effluent stream, which comprises hydrogen, methane, ethane, propane, butane, benzene, toluene and xylene, and separating the resultant fluids in a first vapor-liquid separation zone into a vapor phase first process stream, which comprises hydrogen and $C_1$-$C_7$ hydrocarbons, and a condensate stream which comprises benzene, toluene and xylenes; passing the condensate stream into a fractionation zone, and recovering benzene, toluene and xylenes from the fractionation zone; compressing the first process stream to a pressure above about 430 psig; removing benzene from the first process stream in an absorption zone; passing the first process stream into a membrane separation zone in which the first process stream is contacted with a hydrogen selective permeation membrane under membrane separation conditions, and thereby producing a hydrogen-rich effluent stream which is removed from the process and a vapor phase second process stream, which comprises methane, ethane and propane; forming a vapor phase third process stream comprising methane and a liquid phase fourth process stream, comprising ethane and propane, by partially condensing the second process stream by indirect heat exchange against a coolant medium followed by vapor-liquid separation in a second separation zone operated at a pressure above about 400 psig; flashing the fourth process stream to a substantially lower pressure and thereby forming a vapor phase sixth process stream comprising methane, and a liquid phase fifth process stream, which comprises propane, with the fifth and sixth process streams being substantially cooler than the second process stream; and employing the fifth process stream as at least a part of the previously referred to coolant medium used to partially condense the second process stream.

It is believed that those skilled in the art of petroleum and petrochemical process design may determine proper operating conditions, vessel designs, and operating procedures for the subject process through the use of standard process design techniques after having now been appraised of the overall flow of the process. These design techniques should include a recognition that it is undesirable to pass compounds which may tend to freeze or otherwise solidify into the low temperature portion of the process. For this reason, the absorption zone is provided to remove benzene from the gas stream entering this section of the process. Likewise, a drying zone may be provided. However, it is greatly preferred that the membrane employed in the membrane separation zone will allow water to permeate with the hydrogen at a rate sufficient to dry the gas stream. This is a significant advantage to the use of membranes as the drying zone would not be required. The function of a drying zone would be to prevent the passage of any residual water remaining after the membrane separation step into the low temperature equipment. The drying zone could be required to remove the small amount of water which may be dissolved within the feed stream to the process and any water which may be present on regenerated catalyst passed into the process or released from stripping steam used to seal catalyst passageways, etc. Such a drying zone would preferably be a swing bed desiccant-type system. It is preferred to use two beds of a suitable absorbent alumina, with facilities being provided to regenerate one of these beds while the other bed is on-stream.

If the chosen membrane material employed in the membrane separation zone is adversely affected by the presence of aromatics in the gas stream then the gas stream should be treated to remove the aromatics. This may be done by contacting the gas with an aromatic-free absorption liquid in the absorption zone. The aromatic-free liquid would have to be supplied from an external source not shown in the drawing. A suitable liquid would be a stream of $C_7$ to $C_{10}$ paraffins. This aromatic-free liquid could be employed as the only absorption liquid. It could also be used as a finishing absorption liquid by contacting the gas stream with the aromatic-free liquid after the gas stream has been treated with the $C_7$-plus bottoms liquid of the benzene column. This may be done in an upper section of the absorption column.

The configuration of the membrane separation zone may depart from that shown on the drawing. For instance, a single membrane separation unit or three or more units could be employed in the zone as described in the previously cited references. The type of selective (semipermeable) membrane unit employed is dependent on the cost, quality and suitability of the individual units. The membrane units may be either the hollow fiber or spiral-wound type. Suitable membranes are available commercially and are being applied to a number of industrial processes. Further information is available from U.S. Pat. Nos. 4,209,307; 4,230,463; and 4,268,278 and the previously cited references.

The vapor stream which remains after the partial condensation of the reactor effluent stream is preferably compressed from a pressure under about 70 psig to a pressure greater than 300 psig. This initial compression step is preferably sufficient to provide a high enough pressure that the remaining vapors will flow through the subsequent separation zones without any additional compression. This of course does not refer to recompression of recycled permeate streams, which have relatively low pressures after passing through the membrane. The use of a single compression step in this manner is a central feature of the subject process flow. It is therefore further preferred that this compression step raises the gas stream to a pressure in the range of 350 to 850 psig, with pressures above 430 psig being highly preferred. The "pressure drops" experienced by the flowing gas streams may be significant with pressure drops of 30 psi across a membrane separation stage being expected for the nonpermeate gas. Nevertheless, it is preferred that the pressure drop through the process is held to a practical minimum. For instance, the vapor-liquid separation zone in which the partially condensed nonpermeate materials are separated (second separation zone) should be operated at a pressure within 75 psi of the pressure at which gases are charged to the membrane separation zone. If practical, the pressure of the condensed nonpermeate hydrocarbons prior to being flashed is within 75 psig of the pressure of the gases charged to the membrane separation zone.

The vapor-liquid separation zones employed within the process preferably comprise a suitably sized vertically oriented vessel having a demisting pad or other liquid entrainment removal means provided at the upper end. The various fractionation columns employed in the process are preferably trayed fractionation columns having sieve-type trays and being of relatively standard design. For instance, a properly designed column having 15 trays will function as the stripping column, while the first or debutanizer column may contain 22 trays and the benzene or second column may contain 55 trays. If the membrane can withstand the presence of aromatics, then the liquid employed as the lean absorption liquid is preferably a portion of the net bottoms stream of the second fractionation column as shown in the drawing. However, it is within the scope of the subject process that a sidecut stream removed from this or another column could be employed as the lean absorption liquid stream. Other variations in the arrangement of the fractionation columns are also possible. For instance, it is possible to replace the portion of the feed stream charged to the top of the debutanizer column with an overhead condensing system. The entire single feed stream would then flow directly into the reactor.

I claim as my invention:

1. A process for the recovery of hydrogen from a vapor phase stream derived from a reactor effluent of a hydrocarbon conversion process which comprises the steps of:

(a) compressing a vapor phase first process stream which comprises hydrogen and $C_1$-$C_3$ hydrocarbons;

(b) passing the first process stream into a membrane separation zone in which the first process stream is contacted with at least one selective membrane through which hydrogen selectively permeates and thereby producing a hydrogen-rich product stream which is removed from the process and a vapor phase second process stream which comprises $C_1$-$C_3$ hydrocarbons;

(c) forming a vapor phase third process stream comprising methane and a liquid phase fourth process stream which comprises ethane and propane by partially condensing the second process stream by indirect heat exchange against a cooling medium followed by vapor-liquid separation;

(d) flashing the fourth process stream to a substantially lower pressure and thereby forming a vapor phase sixth process stream, which comprises methane and a liquid phase fifth process stream, which comprises propane;

(e) employing the fifth process stream to cool the second process stream; and (f) removing the fifth and sixth process streams from the process.

2. The process of claim 1 further characterized in that the pressure of the fourth process stream prior to being flashed is within 75 psi of the pressure of the first process stream as it is passed into the membrane separation zone.

3. A process for the recovery of hydrogen from the effluent stream of a hydrogen-producing hydrocarbon conversion process which comprises the steps of:
(a) separating a reaction zone effluent stream, which comprises hydrogen and a mixture of $C_1$-$C_7$ hydrocarbons, into a vapor phase first process stream, which comprises hydrogen and $C_1$-$C_3$ hydrocarbons, and a condensate stream, which comprises $C_6$-plus hydrocarbons, in a first vapor-liquid separation zone;

(b) passing the condensate stream into a fractionation zone in which a $C_6$-plus product of the hydrocarbon conversion process is recovered;

(c) compressing the first process stream to a pressure above about 300 psig;

(d) passing the first process stream into a membrane separation zone in which the first process stream is contacted with semi-permeable membrane which selectively allows the permeation of hydrogen and thereby producing a hydrogen-rich product stream which is removed from the process and a vapor phase second process stream which comprises $C_1$-$C_3$ hydrocarbons;

(d) forming a vapor phase third process stream, which comprises methane, and a liquid phase fourth process stream, which comprises ethane and propane by partially condensing the second process stream by indirect heat exchange against a cooling medium followed by vapor-liquid separation in a second vapor-liquid separation zone at a pressure above about 300 psig;

(e) flashing the fourth process stream to a substantially lower pressure and thereby forming a vapor phase sixth process stream, which comprises methane, and a liquid phase fifth process stream, which comprises propane, with the fourth and fifth process streams being substantially cooler than the second process stream;

(f) employing the fifth process stream as at least a part of the previously referred to coolant medium used to partially condense the second process stream; and (g) withdrawing the fifth process stream and the sixth process stream from the process.

4. The process of claim 3 further characterized in that the reaction zone effluent stream comprises benzene and toluene which are recovered as products of the hydrocarbon conversion process in the fractionation zone.

5. The process of claim 4 further characterized in that benzene is removed from the first process stream by contact with an absorption liquid after the first process stream has been compressed and prior to the passage of the first process stream into the membrane separation zone.

6. The process of claim 5 further characterized in that substantially all $C_6$-plus aromatic compounds are removed from the first process stream prior to the passage of the first process stream into the membrane separation zone.

7. The process of claim 3 further characterized in that the first process stream is compressed from a pressure less than 70 psig to a pressure greater than 430 psig prior to passage into the membrane separation zone.

8. A process for the separation of the effluent stream of a dehydrocyclodimerization process which comprises the steps of:
(a) partially condensing a vapor phase dehydrocyclodimerization reaction zone effluent stream, which comprises hydrogen, methane, ethane, propane, butane, benzene, toluene and xylene, and separating the resultant fluids in a first vapor-liquid separation zone into a vapor phase first process stream, which comprises hydrogen and $C_1$-$C_7$ hydrocarbons, and a condensate stream which comprises benzene, toluene and xylenes;

(b) passing the condensate stream into a fractionation zone, and recovering benzene, toluene and xylenes from the fractionation zone;

(c) compressing the first process stream to a pressure above about 430 psig;

(d) removing benzene from the first process stream in an absorption zone;

(e) passing the first process stream into a membrane separation zone in which the first process stream is contacted with a hydrogen selective permeation membrane under membrane separation conditions, and thereby producing a hydrogen-rich effluent stream which is removed from the process and a vapor phase second process stream, which comprises methane, ethane and propane;

(f) forming a vapor phase third process stream comprising methane and a liquid phase fourth process stream, comprising ethane and propane, by partially condensing the second process stream by indirect heat exchange against a coolant medium followed by vapor-liquid separation in a second separation zone operated at a pressure above about 400 psig;

(g) flashing the fourth process stream to substantially lower pressure and thereby forming a vapor phase sixth process stream comprising methane, and a liquid phase fifth process stream, which comprises propane, with the fifth and sixth process streams being substantially cooler than the second process stream; and (h) employing the fifth process stream as at least a part of the previously referred to coolant medium used to partially condense the second process stream.

9. The process of claim 8 further characterized in that at least a portion of the fifth process stream is passed into the dehydrocyclodimerization reaction zone as a recycle stream.

10. The process of claim 9 further characterized in that the condensate stream comprises propane, propane present in the condensate stream is concentrated into a net overhead stream within the fractionation zone, and in that at least a part of the net overhead stream is passed into the dehydrocyclodimerization reaction zone.

11. The process of claim 10 further characterized in that a liquid phase stream comprising $C_7$-plus hydrocarbons is produced in the fractionation zone and passed into the absorption zone as a lean absorption liquid for the purpose of removing toluene from the vapor phase first process stream.

12. The process of claim 11 further characterized in that the second vapor-liquid separation zone is operated at a pressure within 75 psi of the pressure of the first process stream as it enters the membrane separation zone.

* * * * *